United States Patent
Toyomasu et al.

(10) Patent No.: US 7,001,967 B2
(45) Date of Patent: Feb. 21, 2006

(54) TRANSPARENT HEAT-RESISTANT RESIN OPTICAL MATERIAL AND FILM

(75) Inventors: Shinsuke Toyomasu, Mie (JP); Yojiro Ikai, Mie (JP)

(73) Assignee: Tosoh Corporation, Syuunan (JP)

( * ) Notice: Subject to any disclaimer, the term of this patent is extended or adjusted under 35 U.S.C. 154(b) by 0 days.

(21) Appl. No.: 10/663,667

(22) Filed: Sep. 17, 2003

(65) Prior Publication Data
US 2004/0063887 A1   Apr. 1, 2004

(30) Foreign Application Priority Data

| Sep. 30, 2002 | (JP) | ............................. | 2002-286212 |
| Jan. 16, 2003 | (JP) | ............................. | 2003-008138 |
| Jan. 16, 2003 | (JP) | ............................. | 2003-008139 |
| Jul. 31, 2003 | (JP) | ............................. | 2003-204632 |

(51) Int. Cl.
*C08F 10/00*   (2006.01)

(52) U.S. Cl. ................ 526/348.7; 526/262; 526/348.2; 526/348.6; 526/348.8; 264/1.31; 264/1.34; 264/479; 264/901

(58) Field of Classification Search ................ 526/262, 526/348.2, 348.6, 348.8, 348.7; 264/1.31, 264/1.34, 479, 901
See application file for complete search history.

(56) References Cited

U.S. PATENT DOCUMENTS

| 3,352,832 A |   | 11/1967 | Barr et al. |
| 4,605,700 A | * | 8/1986 | Le-Khac ........................ 525/73 |
| 5,344,916 A | * | 9/1994 | Harris et al. ................ 528/353 |

FOREIGN PATENT DOCUMENTS

| EP | 0 463 612 |   | 1/1992 |
| EP | 1 160 591 |   | 12/2001 |
| GB | 1066715 | * | 4/1967 |
| JP | 5-117334 | * | 5/1993 |
| JP | 2000-162436 |   | 6/2000 |
| JP | 2000-304924 |   | 11/2000 |
| JP | 2000-304925 |   | 11/2000 |
| JP | 2000-329939 |   | 11/2000 |
| JP | 2002-71956 |   | 3/2002 |
| WO | WO 97/30119 |   | 8/1997 |
| WO | WO 03/100480 |   | 12/2003 |

OTHER PUBLICATIONS

Junji Furukawa, et al., "Anisotropy of Styrene- Butadiene Rubber", Journal of Applied Polymer Science, vol. 13, 1969, pp. 2541-2546.

(Continued)

*Primary Examiner*—Helen L. Pezzuto
(74) *Attorney, Agent, or Firm*—Oblon, Spivak, McClelland, Maier & Neustadt, P.C.

(57) ABSTRACT

A transparent heat-resistant resin optical materials having excellent heat resistance and dynamic characteristics, having negative birefringence and exhibiting a high refractive index and a high Abbe number, especially optical compensating members such as films, sheets and retardation films for LCD display element. The transparent heat-resistant resin optical material is made of a copolymer containing a specific olefin residue unit and a specific N-phenyl-substituted maleimide residue unit and having a weight average molecular weight, as reduced into standard polystyrene, of from $5 \times 10^3$ to $5 \times 10^6$, the transparent heat-resistant resin optical material exhibiting negative birefringence; and a retardation film having a relationship of three-dimensional refractive indexes of $nz \geq ny > nx$, $nz > ny \geq nx$, or $nz > nx \geq ny$.

8 Claims, 2 Drawing Sheets

OTHER PUBLICATIONS

Prof. Dr. rer.nat.habil. Hans-Joachim Lorkowski, "Polymere mit speziellen optischen Eigenschaften", Plaste Und Kautschuk, vol. 29, 1982, pp. 618-621.

Takashi Inoue, et al., "Kino Zairyo (Functional Materials)", Material Report R & D, Mar. 1987, pp. 21-29.

Yoshiyuki Nishio, et al., "Molecular orientation and optical anisotrophy induced by the stretching of poly (vinyl alcohol)/poly (N-vinyl pyrrolidone) blends" Polymer, vol. 35, No. 7, 1994, pp. 1452-1461.

T. Okinaka, et al., "Effect of Molecular Structure on the Optical Stress Coefficient of Optical Plastics", Polymer Preprints, Japan, vol. 39, No. 10, 1990, pp. 3824-3826.

Kobunshi no Kotai Kozo (Solid Structure of Polymers) II, pp. 388-399.

Hiroshi Awaya, Primer of Polarization Microscope of Polymer Materials, Chapter 5, pp. 75-97 and 264.

Partial English translation of JP 5-117334 (translation filed Jun. 24, 2004).

* cited by examiner

TRANSPARENT HEAT-RESISTANT RESIN OPTICAL MATERIAL AND FILM

FIELD OF THE INVENTION

The present invention relates to a transparent heat-resistant resin optical material having negative birefringence, which is made of a transparent heat-resistant resin having excellent heat resistance and dynamic characteristics and having a high refractive index and a high Abbe number, and particularly to films, sheets, and retardation films.

DESCRIPTION OF THE RELATED ART

Hitherto, inorganic glasses have been generally used as optical materials. In recent years, it is the state that polymer materials are frequently used from the standpoints of lightweight, productivity and costs.

Examples of materials utilizing such advantages of polymer materials that can be used include polymethyl methacrylate (hereinafter abbreviated as "PMMA"), polystyrenes (hereinafter abbreviated as "PS"), polycarbonates (hereinafter abbreviated as "PC"), and cyclic polyolefins (hereinafter abbreviated as "cyclic PO").

Hitherto, with respect to the function of optical materials, there have been demanded materials not only having excellent heat resistance, environment resistance characteristics and dynamic characteristics but also having high transparency, a high refractive index, a high Abbe number, and low birefringence. Also, materials exhibiting no optical anisotropy and exhibiting no birefringence have been researched and developed.

Although PMMA and PS are excellent in transparency, they were restricted in utility because they have a glass transition temperature (hereinafter referred to as "Tg") in the vicinity of 100° C. and are insufficient in heat resistance and are brittle.

Of the transparent resins, PC is excellent in transparency and toughness and has a Tg in the vicinity of 140° C. and hence, is frequently used as the heat-resistant resin. However, PC involved a problem such that the birefringence is large due to conformation of a skeleton containing bisphenol in the molecular chain.

In recent years, liquid crystal displays (hereinafter referred to as "LCD") and so on are being watched as optical display elements. For the purpose of controlling the optical characteristics, requirements of controlling the optical anisotropy of polymer materials are increasing, and investigations on this issue are increasing. Also, as one of optical materials utilized for the purpose of optical compensation, there are optical compensating films represented by retardation films.

Under such circumstances, PMMA or PS is considered to be a material exhibiting negative birefringence such that when its molecular chain is stretched and oriented, it exhibits optical anisotropy in which the refractive index becomes large in a direction different from the orientation direction (for example, a direction perpendicular thereto). However, it is pointed out that PMMA or PS is not sufficient in heat resistance.

On the other hand, PC or cyclic PO is a material exhibiting positive birefringence such that when its molecular chain is stretched and oriented, it exhibits optical anisotropy in which the refractive index in the orientation direction becomes large. It is the state that PC or cyclic PO is frequently used for utilities such as films capable of optically compensating liquid crystal cells for the purpose of improving an angle of visibility of LCD. However, with respect to the same utilities, there have not yet been available optical materials that are generally required to have heat resistance in terms of a Tg of the same level as in PC, i.e., 140° C., have sufficient heat resistance, and exhibit negative birefringence as the optical anisotropy.

As a method of controlling the optical anisotropy, i.e., birefringence, there have been reported investigations in which a material having a positive birefringence and a material having a negative birefringence are blended or copolymerized to exhibit low birefringence (for example, see *J. Appl. Polym. Sci.*, 13, pp. 2541(1969), *Plaste und Kautschuk*, 29, pp. 618 (1982) and *Kino Zairyo* (Functional Materials), March (1987).

Besides, it is reported that by blending different two kinds of a polymer material exhibiting positive birefringence and a polymer exhibiting negative birefringence and stretching and orienting the blend, it is possible to easily compute and estimate the birefringence through computation and optimize it (for example, see JP-A-2002-071956). On the other hand, it is reported that as a result of evaluation of the birefringence by stretching and orienting a blend based composition of a material exhibiting positive birefringence and a material exhibiting negative birefringence, the additive property reported in JP-A-2002-071956 does not come into effect (for example, see *Polymer*, 35, No. 7, pp. 1452–1461 (1994)). Accordingly, it is difficult to easily estimate birefringence of various kinds of copolymers and polymer blends.

*Kino Zairyo* (Functional Materials), March (1987) reports that examples of those exhibiting negative birefringence include an alternating copolymer of styrene and maleic anhydride, a copolymer of styrene and acrylonitrile, an alternating copolymer of styrene and laurylmaleimide, an alternating copolymer of styrene and phenylmaleimide, and an alternating copolymer of styrene and cyclohexylmaleimide. On the other hand, it is reported that N-alkylmaleimide units exhibit positive birefringence (for example, see *Polymer Preprints, Japan*, 39, No. 10, pp. 3824–3826 (1990)). Further, it is reported that copolymers of an N-alkylmaleimide and styrene exhibit negative birefringence by a styrene unit from the matter that the styrene unit exhibits negative birefringence (for example, see *Kobunshi no Kotai Kozo* (Solid Structure of Polymers) II, pp. 390 (Kyoritsu Shuppan)).

However, it is not the case that the styrene unit always reveals negative birefringence. For example, according to *Polymer*, 35, No. 7, pp. 1452–1461 (1994) and *Kobunshi no Kotai Kozo* (Solid Structure of Polymers) II, pp. 390 (Kyoritsu Shuppan), it is known that even polystyrenes exhibit positive birefringence in the case where a phenyl group as the substituent in the side chain is present in parallel to the molecular chain axis direction and that they exhibit negative birefringence only in the case where the phenyl group crosses at right angles against the molecular chain axis.

Anisotropic data of a polarized atomic group unit constituting a high-molecular weight material are described in *Kobunshi no Kotai Kozo* (Solid Structure of Polymers) II, pp. 390 (Kyoritsu Shuppan) and so on. Only such information does not make one estimate optical anisotropy of a polymer material, and it is difficult to control the optical anisotropy unless taking into overall consideration a ratio of monomers as constitutional units, steric regularity by the polymerization method, and molecular orientation or stress strain characteristics, etc. A relationship between the molecular structure and the function-revealing mechanism for revealing positive or negative birefringence has not yet been elucidated.

There is proposed a method of revealing a function corresponding to the function to reveal negative birefringence using a material exhibiting positive birefringence by a special molding process (for example, see JP-A-2000-162436, JP-A-2000-304924, JP-A-2000-304925 and JP-A-2000-329939).

PC films as a heat-resistant transparent resin exhibiting positive birefringence, when uniaxially stretched under a proper condition, had a relationship of three-dimensional refractive indexes of nx>ny≧nz as shown in FIG. 2 in the case where, as shown in FIG. 1, when the stretching direction within the film plane is an x-axis, the perpendicular direction within the film plane is a y-axis, and the vertical direction outside the film plane is a z-axis, nx stands for a refractive index in the x-axis direction, ny stands for a refractive index in the y-axis direction, and nz stands for a refractive index in the z-axis direction. Also, when biaxially stretched and oriented, such PC films had a relationship of nx≧ny>nz or ny≧nx>nz in the case where, as shown in FIG. 3, the stretching directions within the film plane are an x-axis and a y-axis, and the vertical direction outside the film plane is a z-axis, nx stands for a refractive index in the x-axis direction, ny stands for a refractive index in the y-axis direction, and nz stands for a refractive index in the z-axis direction.

Any of the methods proposed in JP-A-2000-162436, JP-A-2000-304924, JP-A-2000-304925 and JP-A-2000-329939 are a method in which a heat-shrinkable film is stuck on one surface side or both surface sides of a PC film, and shrinkage in the direction within the film plane is controlled at the stretching operation stage to increase a refractive index in the z-axis direction as the vertical direction outside the film plane.

However, it is the actual situation that when it is intended to increase the refractive index in the z-axis direction using PC as the material exhibiting positive birefringence, it is very difficult to control the refractive index by stretching and orientation.

Thus, in view of the foregoing facts, the invention has been made and is aimed at providing transparent heat-resistant resin optical materials having negative birefringence, which have excellent heat resistance and dynamic characteristics and have a high refractive index and a high Abbe number, and particularly films, sheets, and retardation films.

SUMMARY OF THE INVENTION

The present inventors made extensive and intensive investigations about the foregoing problems. As a result, it has been found that a transparent heat-resistant resin optical material comprising a copolymer constituted of a specific olefin residue unit and a specific N-phenyl-substituted maleimide residue unit and having a specific weight average molecular weight has negative birefringence, leading to accomplishment of the invention.

Specifically, the invention relates to a transparent heat-resistant resin optical material comprising a copolymer comprising an olefin residue unit represented by the following formula (i) and an N-phenyl-substituted maleimide residue unit represented by the following formula (ii) and having a weight average molecular weight, as reduced into standard polystyrene, of from $5 \times 10^3$ to $5 \times 10^6$, the transparent heat-resistant resin optical material exhibiting negative birefringence.

(i)

whewrein R1, R2, and R3 each represents hydrogen or an alkyl group having from 1 to 6 carbon atoms.

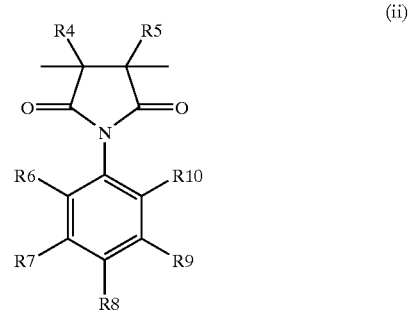

(ii)

wherein R4 and R5 each represents hydrogen or a linear or branched alkyl group having from 1 to 8 carbon atoms; R7, R8, and R9 each represents hydrogen, a halogen based element, a carboxylic acid, a carboxylic acid ester, a hydroxyl group, a cyano group, a nitro group, or a linear or branched alkyl group having from 1 to 8 carbon atoms; and R6 and R10 each represents hydrogen, a halogen based element, a carboxylic acid, a carboxylic acid ester, a hydroxyl group, a cyano group, a nitro group, or a linear or branched alkyl group having from 1 to 8 carbon atoms, and when at least one of R6 or R10 represents hydrogen, the other should not be hydrogen but represent a halogen based element, a carboxylic acid, a carboxylic acid ester, a hydroxyl group, a cyano group, a nitro group, or a linear or branched alkyl group having from 1 to 8 carbon atoms.

DETAILED DESCRIPTION OF THE INVENTION

Figure 1:
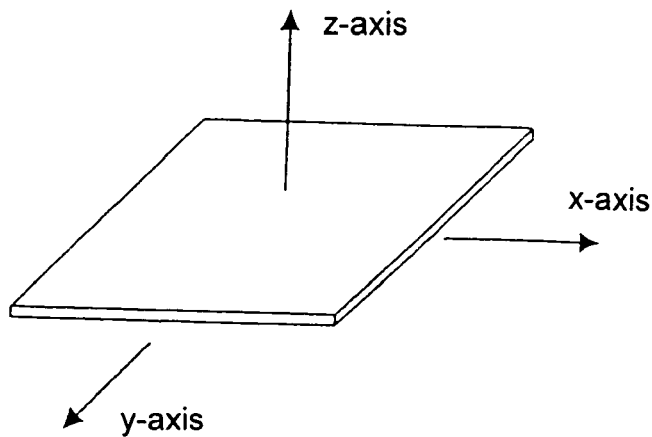
FIG. 1 is a view showing the axis directions of three-dimensional refractive indexes within the film plane.
Figure 2:
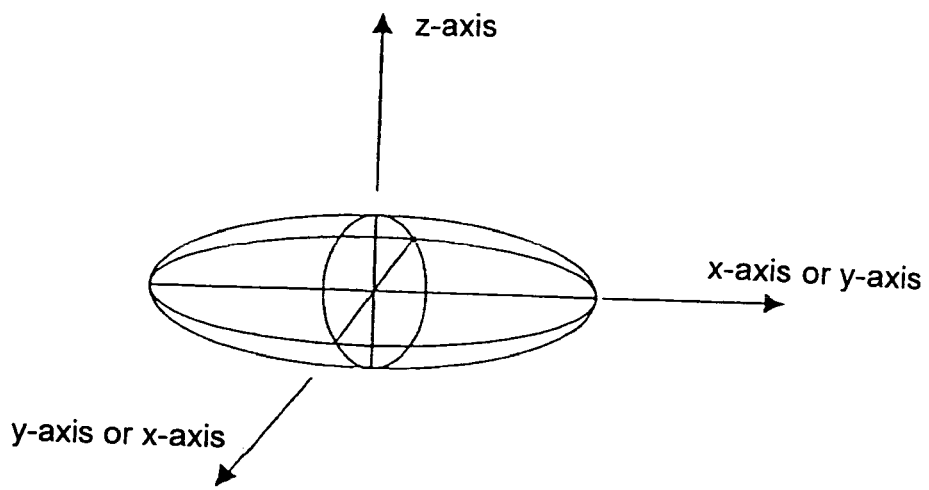
FIG. 2 is a view showing three-dimensional refractive indexes of an optical material having positive birefringence by uniaxial stretching.
Figure 3:
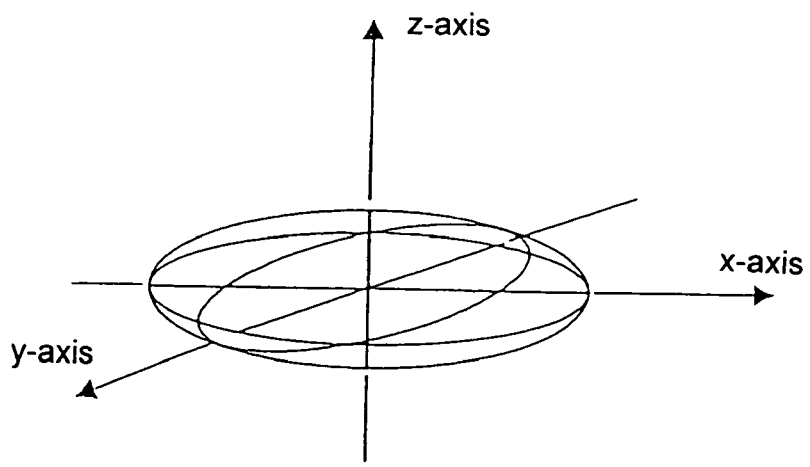
FIG. 3 is a view showing three-dimensional refractive indexes of an optical material having positive birefringence by biaxial stretching.

The invention will be described in detail below.

The transparent heat-resistant resin optical material of the invention comprises a copolymer comprising an olefin residue unit represented by the foregoing formula (i) and an N-phenyl-substituted maleimide residue unit represented by the foregoing formula (ii) and having a weight average molecular weight, as reduced into standard polystyrene, of from $5 \times 10^3$ to $5 \times 10^6$.

In the formula (i) as the constitutional unit of the copolymer to be used in the invention, R1, R2, and R3 each represents hydrogen or an alkyl group having from 1 to 6 carbon atoms. Examples of the alkyl group having from 1 to 6 carbon atoms include a methyl group, an ethyl group, an n-propyl group, an isopropyl group, an n-butyl group, a sec-butyl group, a tert-butyl group, a pentyl group, a hexyl group, a cyclopropyl group, a cyclobutyl group, and a cyclohexyl group. Here, in the case where the number of carbon atoms of the alkyl group exceeds 6, the copolymer may possibly be lowered in heat resistance or crystallized, resulting in deterioration in transparency.

Examples of olefins from which is derived the olefin residue unit represented by the formula (i) include isobutene, 2-methyl-1-butene, 2-methyl-1-pentene, 2-methyl-1-hexene, 2-methyl-1-heptene, 1-isooctene, 2-methyl-1-octene, 2-ethyl-1-pentene, 2-methyl-2-pentene, 2-methyl-2-hexene, ethylene, propylene, 1-butene, and 1-hexene. Above all, 1,2-di-substituted olefins, especially isobutene, are preferable because they can provide copolymers having excellent heat resistance and mechanical characteristics. The olefins may be used alone or in combination of two or more thereof, but the ratio thereof is not restricted.

In the formula (ii) as the constitutional unit of the copolymer to be used in the invention, R4 and R5 each represents hydrogen or a linear or branched alkyl group having from 1 to 8 carbon atoms. Examples of the alkyl group having from 1 to 8 carbon atoms include a methyl group, an ethyl group, an n-propyl group, an isopropyl group, an n-butyl group, a sec-butyl group, a tert-butyl group, a pentyl group, a hexyl group, an octyl group, a cyclopropyl group, a cyclobutyl group, and a cyclohexyl group. In the case where the number of carbon atoms of the linear or branched alkyl group exceeds 8, the copolymer may possibly be deteriorated in heat resistance or cause partial crystallization. R7, R8, and R9 each represents hydrogen, a halogen based element, a carboxylic acid, a carboxylic acid ester, a hydroxyl group, a cyano group, a nitro group, or a linear or branched alkyl group having from 1 to 8 carbon atoms. Examples of the halogen based element include fluorine, chlorine, bromine, and iodine. Examples of the carboxylic acid ester include methyl carboxylate, ethyl carboxylate, propyl carboxylate, butyl carboxylate, phenyl carboxylate, and cyclohexyl carboxylate. Examples of the linear or branched alkyl group having from 1 to 8 carbon atoms include a methyl group, an ethyl group, an n-propyl group, an isopropyl group, an n-butyl group, a sec-butyl group, a tert-butyl group, a pentyl group, a hexyl group, an octyl group, a cyclopropyl group, a cyclobutyl group, and a cyclohexyl group. Here, in the case where the number of carbon atoms of the linear or branched alkyl group exceeds 8, the copolymer may possibly be deteriorated in heat resistance or cause partial crystallization. Further, R6 and R10 each represents hydrogen, a halogen based element, a carboxylic acid, a carboxylic acid ester, a hydroxyl group, a cyano group, a nitro group, or a linear or branched alkyl group having from 1 to 8 carbon atoms, and when at least one of R6 or R10 represents hydrogen, the other should not be hydrogen but represent a halogen based element, a carboxylic acid, a carboxylic acid ester, a hydroxyl group, a cyano group, a nitro group, or a linear or branched alkyl group having from 1 to 8 carbon atoms. Examples of the halogen based element include fluorine, chlorine, bromine, and iodine. Examples of the carboxylic acid ester include methyl carboxylate, ethyl carboxylate, propyl carboxylate, butyl carboxylate, phenyl carboxylate, and cyclohexyl carboxylate. Examples of the linear or branched alkyl group having from 1 to 8 carbon atoms include a methyl group, an ethyl group, an n-propyl group, an isopropyl group, an n-butyl group, a sec-butyl group, a tert-butyl group, a pentyl group, a hexyl group, an octyl group, a cyclopropyl group, a cyclobutyl group, and a cyclohexyl group. Here, in the case where the number of carbon atoms of the linear or branched alkyl group exceeds 8, the copolymer may possibly be deteriorated in heat resistance or cause partial crystallization.

In the case where R6 and R10 each represents hydrogen, i.e., in the case where no substituent is present at the ortho-positions of phenyl, the resulting copolymer has a low Abbe number. Optical materials obtained from such a copolymer do not exhibit negative birefringence.

As N-phenyl-substituted maleimides from which the N-phenyl-substituted maleimide residue unit represented by the formula (ii) is derived, can be used N-phenyl-substituted maleimides in which a specific substituent is present at the ortho-position(s) as an N-substituent of the maleimide compound. Examples include N-(2-methylphenyl)maleimide, N-(2-ethylphenyl)maleimide, N-(2-n-propylphenyl)maleimide, N-(2-isopropylphenyl)maleimide, N-(2-n-butylphenyl)maleimide, N-(2-sec-butylphenyl)maleimide, N-(2-tert-butylphenyl)maleimide, N-(2-n-pentylphenyl)maleimide, N-(2-tert-pentylphenyl)maleimide, N-(2,6-dimethylphenyl)maleimide, N-(2,6-diethylphenyl)maleimide, N-(2,6-di-n-propylphenyl)maleimide, N-(2,6-diisopropylphenyl)maleimide, N-(2-methyl-6-ethylphenyl)maleimide, N-(2-methyl-6-isopropylphenyl)maleimide, N-(2-chlorophenyl)maleimide, N-(2-bromophenyl)maleimide, N-(2,6-dichlorophenyl)maleimide, N-(2,6-dibromophenyl)maleimide, N-(2-biphenyl)maleimide, N-(2-diphenylether)maleimide, N-(2-cyanophenyl)maleimide, and N-(2-nitrophenyl)maleimide. These compounds may be used alone or in combination of two or more thereof, but the ratio thereof is not restricted. Above all, one or more N-phenyl-substituted maleimides selected from the group consisting of N-(2-methylphenyl)maleimide, N-(2,6-dimethylphenyl)maleimide, N-(2,6-diethylphenyl)maleimide, and N-(2,6-diisopropylphenyl)maleimide are especially preferable because transparent heat-resistant resin optical materials having excellent heat resistance and mechanical properties and exhibiting relatively high negative birefringence are obtained.

With respect to the substituent to be introduced into the phenyl group in the formula (ii), it is important to utilize those in which a specific substituent is introduced at the ortho-position(s) from the viewpoint of the desired optical function. In addition, other substituents may be introduced at the meta-position(s) and/or the para-position. Examples of such N-phenyl-substituted maleimides include N-(2,4,6-trimethylpheny)maleimide, N-(2,4-dimethylphenyl)maleimide, N-(perbromophenyl)maleimide, N-(2-methyl-4-hydroxyphenyl)maleimide, and N-(2,6-diethyl-4-hydroxyphenyl)maleimide.

The copolymer that is used in the transparent heat-resistant resin optical material of the invention has a weight average molecular weight, as reduced into standard polystyrene, of from $5 \times 10^3$ to $5 \times 10^6$. In the case of copolymers having a weight average molecular weight exceeding $5 \times 10^6$, it is difficult to mold them as optical materials. On the other hand, in the case of copolymers having a weight average molecular weight of less than $5 \times 10^3$, the resulting copolymers are very brittle so that it is difficult to use them as optical materials. Incidentally, the weight average molecular weight can be obtained by measuring an elution curve of the copolymer by gel permeation chromatography (hereinafter referred to as "GPC") as reduced into standard polystyrene.

The copolymer to be used in the invention is especially preferably an alternating copolymer in which the olefin residue unit represented by the formula (i) and the N-phenyl-substituted maleimide residue unit represented by the formula (ii) are alternately copolymerized because transparent heat-resistant resin optical materials having excellent heat resistance and mechanical properties are provided.

The copolymer to be used in the invention, which comprises the olefin residue unit represented by the formula (i) and the N-phenyl-substituted maleimide residue unit represented by the formula (ii), can be, for example, synthesized by polymerizing the foregoing olefin and the foregoing N-phenyl-substituted maleimide in a known polymerization method such as a radical polymerization method. As the radical polymerization method, are employable various polymerization methods such as a block polymerization method, a solution polymerization method, a suspension polymerization method, and an emulsion polymerization method.

As another method, the copolymer can also be obtained by copolymerizing the foregoing olefin with maleic anhydride to obtain an olefin-maleic anhydride copolymer, to which is then added an aniline having a substituent at at least one ortho-position thereof to amidate the maleic anhydride site upon reaction with the aniline, followed by imidation to undergo cyclization. Examples of anilines that can be used include 2-methylaniline, 2-ethylaniline, 2-n-propylaniline, 2-isopropylaniline, 2-n-butylaniline, 2-sec-butylaniline, 2-tert-butylaniline, 2-n-pentylaniline, 2-tert-pentylaniline, 2,6-dimethylaniline, 2,6-diethylaniline, 2,6-di-n-propylaniline, 2,6-diisopropylaniline, 2-methyl-6-ethylaniline, 2-methyl-6-isopropylaniline, 2-chloroaniline, 2-bromoaniline, 2,6-dichloroaniline, and 2,6-dibromoaniline. These compounds may be used singly or in combination of two or more thereof, but the ratio thereof is not restricted. Above all, one or more anilines selected from the group consisting of 2-methylaniline, 2,6-dimethylaniline, 2,6-diethylaniline, and 2,6-diisopropylaniline are especially preferable because transparent heat-resistant resin optical materials having excellent heat resistance and mechanical properties and exhibiting relatively high negative birefringence are obtained.

The copolymer to be used in the invention has a phenyl substituent having large atomic group polarization as the N-substituent of the maleimide residue unit so that it exhibits a high refractive index. This is also clear from the Lorentz-Lorentz equation showing the relationship between molecular structure and refractive index as described in *Polymer Science, One Point* 10: *Optical Properties of Polymers* (*Chapter* 1: *Refractive Index*) (written by Yasuhiro Koike, edited by The Society of Polymer Science, Japan and published by Kyoritsu Shuppan (1994)).

Also, the copolymer to be used in the invention has a high Abbe number. In general, it is estimated that the Abbe number becomes low by aromatic groups such as a phenyl group to be introduced as the N-substituent of the maleimide residue unit, as the refractive index increases in short wavelength regions. However, in the copolymer to be used in the invention, by introducing a functional group as the substituent at the ortho-position(s) (i.e., R6 and R10) of the phenyl group to be introduced as the N-substituent, it is possible to obtain an improving effect of the Abbe number. In addition, by introducing a functional group as the substituent at the meta-position(s) and the para-position (i.e., R7, R8 and R9), it is possible to further enhance the improving effect of the Abbe number.

The transparent heat-resistant resin optical material of the invention is an optical material having negative birefringence.

In the transparent heat-resistance resin optical material of the invention, by orienting the molecular chain of the copolymer comprising the olefin residue unit represented by the formula (i) and the N-phenyl-substituted maleimide residue unit represented by the formula (ii) during molding, the negative birefringence is revealed. As a method of orienting the molecular chain, any methods of enabling to orient the molecular chain can be employed, and examples include various methods such as stretching, calendering, and drawing. Above all, stretching is especially preferable for the production because transparent heat-resistant resin optical materials having negative birefringence can be produced with good productivity. Examples of the stretching that can be used include uniaxial stretching such as free-width uniaxial stretching and fixed-width uniaxial stretching; and biaxial stretching such as sequential biaxial stretching and simultaneous biaxial stretching. Besides, as devices for carrying out calendering, for example, a roll stretching machine and a tenter type stretching machine are known. Besides, as small-sized experimental biaxial stretching devices, any devices capable of performing free-width uniaxial stretching, fixed-width uniaxial stretching, sequential biaxial stretching, or simultaneous biaxial stretching may be employed.

Since the transparent heat-resistant resin optical material of the invention is especially excellent as an optical material, it is preferable to have a refractive index of 1.50 or more, an Abbe number of 30 or more, and a Tg of 100° C. or higher, preferably 120° C. or higher, and particularly preferably 140° C. or higher.

The transparent heat-resistant resin optical material of the invention can be, for example, used as a film or a sheet. It is preferable to produce the film or sheet by uniaxial stretching or biaxial stretching. In the case of the film, it is particularly preferable to use the film as a retardation film corresponding to a retardation film having positive birefringence and as a retardation film having negative birefringence, an aspect of which has hitherto been demanded. The term "film" as referred to herein is one having a thickness of not more than about 200 μm, and the term "sheet" as referred to herein is one having a thickness exceeding this range. In addition, the transparent heat-resistant resin optical material of the invention is suitable as an optical compensating member for liquid crystal display element represented by retardation films.

The transparent heat-resistant resin optical material having negative birefringence according to the invention can be produced by a method of orienting the molecular chain represented by stretching or calendering. As the production method, there can be enumerated a method in which primary molding is carried out by a usual molding method such as injection molding, extrusion molding, blow molding, inflation molding, roll molding, and solution cast molding, and the molecular chain is then oriented as secondary molding by the foregoing uniaxial stretching such as free-width uniaxial stretching and fixed-width uniaxial stretching; biaxial stretching such as sequential biaxial stretching and simultaneous biaxial stretching; roll stretching; tenter type stretching; or the like.

Especially in producing films or sheets, especially retardation films as the transparent heat-resistant resin optical material, it is preferable to produce a raw roll of film or sheet by a usual method of producing films or sheets as the primary molding, such as injection molding, extrusion molding, inflation molding, and solution casting and stretch the resulting film or sheet by uniaxial stretching such as free-width stretching and fixed-width stretching or biaxial stretching such as sequential stretching and simultaneous stretching, because films or sheets having good quality and high negative birefringence, especially retardation films can be produced with good efficiency. Also, in stretching, it is preferable to carry out stretching and orientation at a temperature in the range of from [Tg (of the copolymer)−20° C.] to [Tg+30° C.], especially in the range of from [Tg−20° C.] to [Tg+20° C.] because transparent heat-resistance resin optical materials having especially high negative birefringence and suited as a retardation film can be produced with good production efficiency.

In the case where a film or a sheet is produced by extrusion molding as the primary molding, by molding the copolymer by passing it through a thin clearance of a die called a T-die, it is possible to obtain a film or a sheet having an arbitrary thickness. During this, it is desired to previously heat and dry the copolymer at a temperature in the range of from 80 to 130° C. Thus, it is possible to prevent appearance failure by gasification during molding, etc. In the extrusion molding, it is preferred to set a filter for filtering contamination depending upon the desired thickness and optical purity. With respect to the extrusion molding condition, for the sake of controlling the orientation of the molecular chain, it is preferable to carry out the molding at a temperature sufficiently higher than Tg at which the copolymer melt flows due to a shear stress and at a rate of shear of less than 1,000/sec. For cooling for solidification of the film in the molten state after passing through the die, it is possible to utilize a low-temperature metallic roller or a steel belt.

In the case where a film or a sheet is produced by solution casting as the primary molding, solvents in which the copolymer is soluble are selected, and a plurality of solvents may be used as the need arises. Examples of solvents that can be used for the solution casting include methylene chloride, chloroform, chlorobenzene, toluene, xylene, and methyl ethyl ketone, but it should not be construed that the solvent is limited to these compounds. Especially, a good solvent (such as methylene chloride and chloroform) to the copolymer can be combined with a poor solvent (such as alcohols including methanol and ethanol) for the purpose of controlling the rate of volatilization of the solvent.

In drying the substrate by solution casting, it is important to form no bubble or internal void within the film or sheet by setting up the heating condition, and it is preferred that the concentration of the residual solvent be not more than 2 wt % at the time of stretching operation as the subsequent secondary molding. Also, for the sake of making the film or sheet obtained after stretching reveal uniform negative birefringence, it is desired that the film or sheet obtained by the primary molding is free from heterogenous orientation or residual strain and is optically isotropic. As such a method, solution casting is preferable.

In the stretching step as the secondary molding, it is preferable to carry out the stretching operation at a temperature in the range of from [Tg (of the copolymer)−20° C.] to [Tg+30° C.]. The term "Tg" as referred to herein means a region of from a temperature at which the storage modulus of the copolymer begins to decrease as the subject material begins to be lowered, whereby the loss modulus becomes higher than the storage modulus, to a temperature at which the orientation of the polymer chain disappears due to relaxation. The Tg can be measured by a differential scanning calorimeter (DSC).

Also, the stretching temperature as the stretching operation during stretching, the rate of strain during stretching the film, the rate of deformation, and the like may be properly selected so far as the object of the invention can be attained. During this, *Polymer Processing, One Point* 2 (*To Make Films*) (written by Kiyoichi Matsumoto, edited by The Society of Polymer Science, Japan and published by Kyoritsu Shuppan (1993)) can be referred to.

Figure 4:
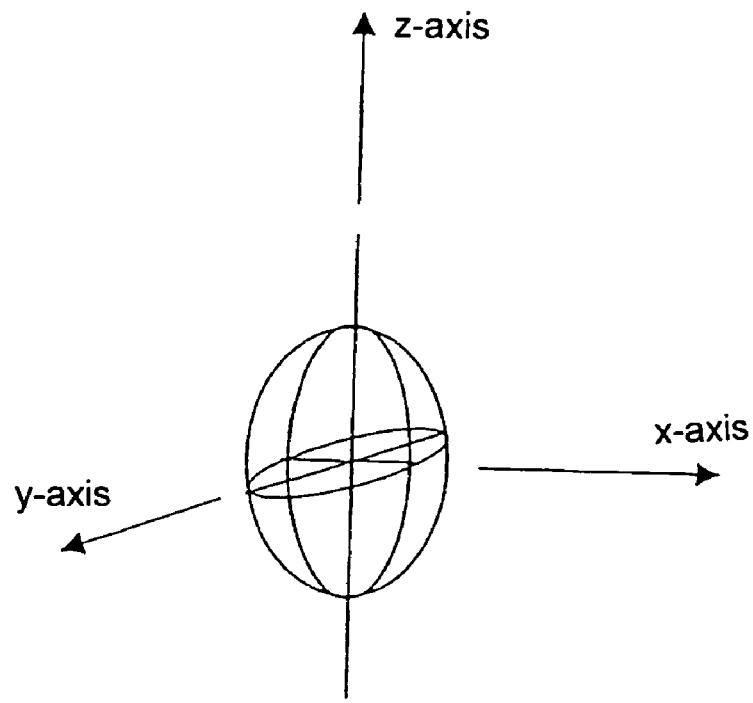
FIG. 4 is a view showing three-dimensional refractive indexes of an optical material having negative birefringence by uniaxial stretching.

In the case where the transparent heat-resistant resin optical material of the invention exhibits negative birefringence, and the film obtained by primary molding is uniaxially stretched, optical compensating members such as retardation films having a relationship of three-dimensional refractive indexes of $nz \geq ny > nx$ as shown in FIG. 4 in the case where when the stretching direction is an x-axis within the film plane, the perpendicular direction within the film plane is a y-axis, and the vertical direction outside the film plane is a z-axis, nx stands for a refractive index in the x-axis direction, ny stands for a refractive index in the y-axis direction, and nz stands for a refractive index in the z-axis direction, are preferable. Such optical compensating members can be produced by molding a copolymer comprising the olefin residue unit represented by the formula (i) and the N-phenyl-substituted maleimide residue unit represented by the formula (ii) and having a weight average molecular weight, as reduced into standard polystyrene, of from $5 \times 10^3$ to $5 \times 10^6$ into a film by the foregoing extrusion molding, solution casting, etc. as the primary molding and subjecting the film to uniaxial stretching such as free-width uniaxial stretching and fixed-width uniaxial stretching as the secondary molding in the temperature range, based on a glass transition temperature of the copolymer, of from (Tg−20° C.) to (Tg+30° C.), and preferably from (Tg−20° C.) to (Tg+20° C.).

Figure 5:
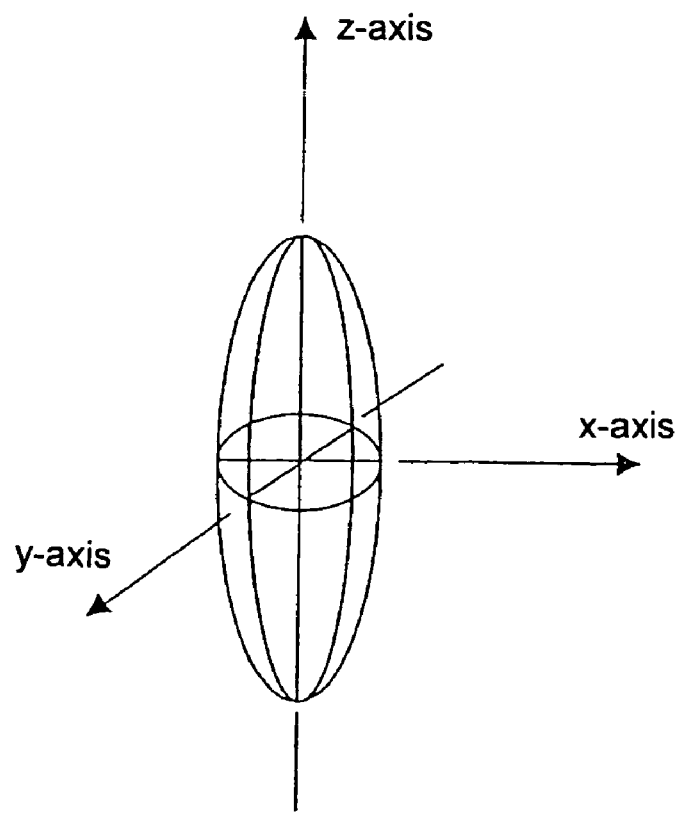
FIG. 5 is a view showing three-dimensional refractive indexes of an optical material having negative birefringence by biaxial stretching.

In addition, in the case where the transparent heat-resistant resin optical material of the invention exhibits negative birefringence, and the film obtained by primary molding is biaxially stretched, optical compensating members such as retardation films having a relationship of three-dimensional refractive indexes of $nz > ny \geq nx$ or $nz > nx \geq ny$ as shown in FIG. 5 in the case where the biaxial stretching directions are an x-axis within the film plane and a y-axis within the film plane, and the vertical direction outside the film plane is a z-axis, nx stands for a refractive index in the x-axis direction, ny stands for a refractive index in the y-axis direction, and nz stands for a refractive index in the z-axis direction. Such optical compensating members can be produced by molding a copolymer comprising the olefin residue unit represented by the formula (i) and the N-phenyl-substituted maleimide residue unit represented by the formula (ii) and having a weight average molecular weight, as reduced into standard polystyrene, of from $5 \times 10^3$ to $5 \times 10^6$ into a film by the foregoing extrusion molding, solution casting, etc. as the primary molding and subjecting the film to biaxial stretching such as sequential biaxial stretching and simultaneous biaxial stretching as the secondary molding in the temperature range, based on a glass transition temperature of the copolymer, of from (Tg−20° C.) to (Tg+30° C.), and preferably from (Tg−20° C.) to (Tg+20° C.).

In the transparent heat-resistant resin optical material of the invention, especially the retardation film, it is possible to grasp the birefringence characteristics by using a retardation amount as the retardation. With respect to the definition of the retardation amount as referred to herein, in the case where the transparent heat-resistant resin optical material is a film, the retardation amount can be expressed by a value obtained by multiplying each of differences of nx, ny and nz as the three-dimensional refractive indexes in the x-axis, y-axis and z-axis directions, respectively of the film obtained by stretching by a thickness (d) of the film. Specifically, there can be enumerated (nx−ny) as a difference of the refractive indexes within the film plane and (nx−nz) and (ny−nz) as differences outside the film plane. In the case where the birefringence characteristics are evaluated in terms of the retardation amount, specifically in the case of the uniaxially stretched film, when the stretching direction is the x-axis, the perpendicular direction within the plane is the y-axis, and the vertical direction outside the plane is the z-axis, a retardation amount within the film plane can be expressed by Re=(nx−ny)d, and retardation amounts outside the film plane can be expressed by Re=(nx−nz)d and Re=(ny−nz)d, respectively. In the case of the biaxially stretched film, when the stretching directions are the x-axis and the y-axis, and the vertical direction outside the plane is the z-axis, if the stretching ratios on the x-axis and the y-axis are identical, there is some possibility that the birefringence characteristics cannot be grasped at a retardation amount within the film plane, Re=(nx−ny)d. In such case, it is effective to express retardation amounts, Re=(nx−nz)d and Re=(ny−nz)d.

The transparent heat-resistant resin optical material of the invention may further contain additives such as heat stabilizers and anti-ultraviolet stabilizers, lubricants, and plasticizers as the need arises, so far as the object of the invention is not hindered. As such additives including stabilizers, lubricants, and plasticizers, known additives for resin materials may be used.

The transparent heat-resistant resin optical material of the invention may be provided with a hard coating for the purpose of protecting the surface thereof. Known hard coating agents can be used.

Although the transparent heat-resistant resin optical material of the invention can be used singly, when it is laminated with an optical material of the same kind and/or an optical material of a different kind, it is possible to further control the optical characteristics. Examples of optical materials to be laminated include polarizing plates comprising a combination of polyvinyl alcohol/pigment/acetyl cellulose and polycarbonate-made stretched and oriented films, but it should not be construed that the invention is limited thereto.

The transparent heat-resistant resin optical material having negative birefringence according to the invention is suitably used as an optical compensating member for liquid crystal display element. Examples include retardation films such as STN type LCD, TFT-TN type LCD, OCB type LCD, VA type LCD, and IPS type LCD; ½ wavelength plates; ¼ wavelength plates; reverse wavelength dispersion characteristic films; optical compensating films; color filters; laminated films with a polarizing plate; and polarizing plate optical compensating films. The utility of the invention as applications is not limited thereto, but the invention can be widely utilized in the case of utilizing negative birefringence.

The invention will be described in more detail with reference to the following Examples, but it should not be construed that the invention is limited thereto.

The resulting transparent heat-sensitive resin optical materials were evaluated in the following methods.

Measurement of Light Transmittance:
As one evaluation of the transparency, a light transmittance was measured according to JIS K7105 (1981).

Measurement of Haze:
As one evaluation of the transparency, a haze was measured according to JIS K7105 (1981).

Judgment of Positive and Negative of Birefringence:
Positive and negative of birefringence was judged by the additive color process with a λ/4 plate using a polarization microscope described in *Primer of Polarization Microscope of Polymer Materials* (written by Hiroshi Awaya and published by Agune Gijutsu Center, Chapter 5, pp. 78–82 (2001)).

Measurement of Retardation Amount:
A retardation amount was measured by a polarization microscope (Senarmont compensation process) using a Senarmont compensator described in *Primer of Polarization Microscope of Polymer Materials* (written by Hiroshi Awaya and published by Agune Gijutsu Center, Chapter 5, pp. 78–82 (2001)).

Measurement of Refractive Index and Abbe Number:
The measurement was carried out according to JIS K7142 (1981).

Measurement of Glass Transition Temperature:
The measurement was carried out at a temperature-rising rate of 10° C./min using a differential scanning calorimeter (manufactured by Seiko Instruments Inc., trade name: DSC2000).

Measurement of Weight Average Molecular Weight and Number Average Molecular Weight:
A molecular weight was obtained as a value reduced into standard polystyrene from an elution curve of the copolymer measured using a gel permeation chromatograph (manufactured by Tosoh Corporation, trade name: HLC-802A).

Measurement of Three-Dimensional Refractive Indexes:
The measurement was carried out using a sample inclination type automatic birefringence analyzer (manufactured by Oji Scientific Instruments, trade name: KOBRA-21).

EXAMPLE 1

In a one-liter autoclave were charged 400 ml of toluene as a polymerization solvent, 0.001 moles of perbutyl neodecanoate as a polymerization initiator, 0.42 moles of N-(2-methylphenyl)maleimide, and 4.05 moles of isobutene, and the mixture was subjected to polymerization reaction under a polymerization condition at a polymerization temperature of 60° C. for a polymerization time of 5 hours, to obtain N-(2-methylphenyl)maleimide-isobutene alternating copolymer. The thus obtained N-(2-methylphenyl)maleimide-isobutene alternating copolymer had a weight average molecular weight (Mw) (as reduced into standard polystyrene) of 160,000 and a molecular weight distribution (Mw/Mn), which is expressed by [(weight average molecular weight (Mw))/(number average molecular weight (Mn))], of 2.7.

A solution consisting of 20% by weight of the resulting N-(2-methylphenyl)maleimide-isobutene alternating copolymer and 80% by weight of methylene chloride was prepared and cast on a polyethylene terephthalate film (hereinafter referred to as "PET film"). An N-(2-methylphenyl)maleimide-isobutene alternating copolymer film formed after the methylene chloride had been volatilized and solidified from the solution was peeled. The film after peeling was dried at 100° C. for 4 hours and further dried while raising the temperature from 120° C. to 160° C. with an interval of 10° C. for one hour at the respective temperature. Thereafter, the resulting film was dried in vacuo at 180° C. for 4 hours using a vacuum dryer, to obtain a film having a thickness of about 100 μm. The resulting film had a light transmittance of 92%, a haze of 0.3%, a refractive index of 1.57, an Abbe number of 37, a retardation amount of 0 nm, and a Tg of 206° C.

The film was cut into a piece having a size of 5 cm×5 cm, which was then stretched by +50% upon free-width uniaxial stretching under a condition at a temperature of 220° C. and at a rate of stretching of 15 mm/min using a biaxial stretching machine (manufactured by Shibayama Scientific Co., Ltd.), to obtain a stretched film. The obtained stretched film had negative birefringence and a retardation amount, Re=$(n_x-n_y)d$ of −125 nm per 100 μm of the stretched film thickness. Here, d stands for a film thickness.

EXAMPLE 2

In a one-liter autoclave were charged 400 ml of toluene as a polymerization solvent, 0.001 moles of perbutyl neodecanoate as a polymerization initiator, 0.42 moles of N-(2,6-diethylphenyl)maleimide, and 4.05 moles of isobutene, and the mixture was subjected to polymerization reaction under a polymerization condition at a polymerization temperature of 60° C. for a polymerization time of 5 hours, to obtain N-(2,6-diethylphenyl)maleimide-isobutene alternating copolymer. The thus obtained N-(2,6-diethylphenyl)maleimide-isobutene alternating copolymer had a weight average molecular weight (Mw) (as reduced into standard polystyrene) of 170,000 and an Mw/Mn of 2.6.

A solution consisting of 20% by weight of the resulting N-(2,6-diethylphenyl)maleimide-isobutene alternating copolymer and 80% by weight of methylene chloride was prepared and cast on a PET film. An N-(2,6-diethylphenyl)maleimide-isobutene alternating copolymer film formed after the methylene chloride had been volatilized and solidified from the solution was peeled. The film after peeling was dried at 100° C. for 4 hours and further dried while raising the temperature from 120° C. to 160° C. with an interval of 10° C. for one hour at the respective temperature. Thereafter, the resulting film was dried in vacuo at 180° C. for 4 hours using a vacuum dryer, to obtain a film having a thickness of about 100 μm. The resulting film had a light transmittance of 92%, a haze of 0.3%, a refractive index of 1.55, an Abbe number of 40, a retardation amount of 0 nm, and a Tg of 209° C.

The film was cut into a piece having a size of 5 cm×5 cm, which was then stretched by +50% upon free-width uniaxial stretching under a condition at a temperature of 220° C. and at a rate of stretching of 15 mm/min using a biaxial stretching machine (manufactured by Shibayama Scientific Co., Ltd.), to obtain a stretched film. The obtained stretched film had negative birefringence and a retardation amount within the film plane, Re=$(n_x-n_y)d$ of −120 nm per 100 μm of the stretched film thickness. Here, d stands for a film thickness. The three-dimensional refractive indexes were $n_x=1.53913$, $n_y=1.54042$, and $n_z=1.54045$. Thus, it was revealed that the resulting stretched film was suitable as a retardation film having negative birefringence.

EXAMPLE 3

The N-(2,6-diethylphenyl)maleimide-isobutene alternating copolymer obtained in Example 2 was molded into a film upon T-die extrusion at a processing temperature of 285° C. using a 20 mm diameter biaxial extruder (manufactured by Toyo Seiki Seisaku-Sho, Ltd., trade name: Labo Plastomill). There was thus obtained a film having a thickness of 100 μm. The obtained film had a light transmittance of 92%, a haze of 0.5%, a refractive index of 1.55, and an Abbe number of 40. This film was heated in an oven of 240° C. for one hour. The resulting film had a retardation amount of 2 nm and a Tg of 209° C.

The resulting film was subjected to free-width uniaxial stretching in the same manner as in Example 2, to obtain a stretched film. The obtained stretched film had negative birefringence and a retardation amount within the film plane, Re=$(n_x-n_y)d$ of −120 nm per 100 μm of the stretched film thickness. Here, d stands for a film thickness. The three-dimensional refractive indexes were $n_x=1.53913$, $n_y=1.5404$, and $n_z=1.54045$. Thus, it was revealed that the resulting stretched film was suitable as a retardation film having negative birefringence.

EXAMPLE 4

A stretched film was obtained in the same manner as in Example 2, except that in Example 2, the temperature for stretching the film was changed to 230° C. in place of 220° C. The obtained stretched film had negative birefringence and a retardation amount within the film plane, Re=$(n_x-n_y)d$ of −68 nm per 100 μm of the stretched film thickness. Here, d stands for a film thickness. The three-dimensional refractive indexes were $n_x=1.53946$, $n_y=1.54023$, and $n_z=1.54031$. Thus, it was revealed that the resulting stretched film was suitable as a retardation film having negative birefringence.

EXAMPLE 5

A stretched film was obtained in the same manner as in Example 2, except that in Example 2, the film stretching was carried out upon simultaneous biaxial stretching using a biaxial stretching machine (manufactured by Imoto Machinery Co., Ltd.) in place of the free-width uniaxial stretching using a biaxial stretching machine (manufactured Shibayama Scientific Co., Ltd.), such that the film was stretched by +50% in the x-axis direction and the y-axis direction, respectively. The obtained stretched film had negative birefringence and a retardation amount outside the film plane, Re=$(n_x-n_z)d$ of −120 nm per 100 μm of the stretched film thickness. Here, d stands for a film thickness. The three-dimensional refractive indexes were $n_x=1.53990$, $n_y=1.53986$, and $n_z=1.54021$. Thus, it was revealed that the resulting stretched film was suitable as a retardation film having negative birefringence.

EXAMPLE 6

A stretched film was obtained in the same manner as in Example 3, except that in Example 3, the film stretching was carried out upon simultaneous biaxial stretching using a biaxial stretching machine (manufactured by Imoto Machinery Co., Ltd.) in place of the free-width uniaxial stretching using a biaxial stretching machine (manufactured Shibayama Scientific Co., Ltd.), such that the film was stretched by +50% in the x-axis direction and the y-axis direction, respectively. The obtained stretched film had negative birefringence and a retardation amount outside the film plane, $Re=(nx-nz)d$ of −120 nm per 100 μm of the stretched film thickness. Here, d stands for a film thickness. The three-dimensional refractive indexes were $nx=1.53994$, $ny=1.53986$, and $nz=1.54026$. Thus, it was revealed that the resulting stretched film was suitable as a retardation film having negative birefringence.

EXAMPLE 7

In a one-liter autoclave were charged 400 ml of toluene as a polymerization solvent, 0.001 moles of perbutyl neodecanoate as a polymerization initiator, 0.42 moles of N-(2,6-diisopropylphenyl)maleimide, and 4.05 moles of isobutene, and the mixture was subjected to polymerization reaction under a polymerization condition at a polymerization temperature of 60° C. for a polymerization time of 5 hours, to obtain N-(2,6-diisopropylphenyl)maleimide-isobutene alternating copolymer. The thus obtained N-(2,6-diisopropylphenyl)maleimide-isobutene alternating copolymer had a weight average molecular weight (Mw) (as reduced into standard polystyrene) of 158,000 and an Mw/Mn of 2.6.

A solution consisting of 20% by weight of the resulting N-(2,6-diisopropylphenyl)maleimide-isobutene alternating copolymer and 80% by weight of methylene chloride was prepared and cast on a PET film. An N-(2,6-diisopropylphenyl)maleimide-isobutene alternating copolymer film formed after the methylene chloride had been volatilized and solidified from the solution was peeled. The film after peeling was dried at 100° C. for 4 hours and further dried while raising the temperature from 120° C. to 160° C. with an interval of 10° C. for one hour at the respective temperature. Thereafter, the resulting film was dried in vacuo at 180° C. for 4 hours using a vacuum dryer, to obtain a film having a thickness of about 100 μm. The resulting film had a light transmittance of 92%, a haze of 0.3%, a refractive index of 1.55, an Abbe number of 42, a retardation amount of 0 nm, and a Tg of 235° C.

The film was cut into a piece having a size of 5 cm×5 cm, which was then stretched by +50% upon free-width uniaxial stretching under a condition at a temperature of 240° C. and at a rate of stretching of 15 mm/min using a biaxial stretching machine (manufactured by Shibayama Scientific Co., Ltd.), to obtain a stretched film. The obtained stretched film had negative birefringence and a retardation amount within the film plane, $Re=(nx-ny)d$ of −130 nm per 100 μm of the stretched film thickness. Here, d stands for a film thickness. Thus, it was revealed that the resulting stretched film was suitable as a retardation film having negative birefringence.

COMPARATIVE EXAMPLE 1

In a one-liter autoclave were charged 400 ml of toluene as a polymerization solvent, 0.001 moles of perbutyl neodecanoate as a polymerization initiator, 0.42 moles of N-phenylmaleimide, and 4.05 moles of isobutene, and the mixture was subjected to polymerization reaction under a polymerization condition at a polymerization temperature of 60° C. for a polymerization time of 5 hours, to obtain N-phenylmaleimide-isobutene alternating copolymer. The thus obtained N-phenylmaleimide-isobutene alternating copolymer had a weight average molecular weight (Mw) (as reduced into standard polystyrene) of 162,000 and an Mw/Mn of 2.6.

A solution consisting of 20% by weight of the resulting N-phenylmaleimide-isobutene alternating copolymer and 80% by weight of methylene chloride was prepared and cast on a PET film. An N-phenylmaleimide-isobutene alternating copolymer film formed after the methylene chloride had been volatilized and solidified from the solution was peeled. The film after peeling was dried at 100° C. for 4 hours and further dried while raising the temperature from 120° C. to 160° C. with an interval of 10° C. for one hour at the respective temperature. Thereafter, the resulting film was dried in vacuo at 180° C. for 4 hours using a vacuum dryer, to obtain a film having a thickness of about 100 μm. The resulting film had a light transmittance of 92%, a haze of 0.3%, a refractive index of 1.55, an Abbe number of 42, a retardation amount of 0 nm, and a Tg of 192° C.

The film was cut into a piece having a size of 5 cm×5 cm, which was then stretched by +50% upon free-width uniaxial stretching under a condition at a temperature of 210° C. and at a rate of stretching of 15 mm/min using a biaxial stretching machine (manufactured by Shibayama Scientific Co., Ltd.), to obtain a stretched film. The obtained stretched film had positive birefringence and a retardation amount within the film plane, $Re=(nx-ny)d$ of +85 nm per 100 μm of the stretched film thickness. Here, d stands for a film thickness.

COMPARATIVE EXAMPLE 2

In a one-liter autoclave were charged 400 ml of toluene as a polymerization solvent, 0.001 moles of perbutyl neodecanoate as a polymerization initiator, 0.42 moles of N-methylmaleimide, and 4.05 moles of isobutene, and the mixture was subjected to polymerization reaction under a polymerization condition at a polymerization temperature of 60° C. for a polymerization time of 5 hours, to obtain N-methylmaleimide-isobutene alternating copolymer. The thus obtained N-methylmaleimide-isobutene alternating copolymer had a weight average molecular weight (Mw) (as reduced into standard polystyrene) of 165,000 and an Mw/Mn of 2.6.

A solution consisting of 20% by weight of the resulting N-methylmaleimide-isobutene alternating copolymer and 80% by weight of methylene chloride was prepared and cast on a PET film. An N-methylmaleimide-isobutene alternating copolymer film formed after the methylene chloride had been volatilized and solidified from the solution was peeled. The film after peeling was dried at 100° C. for 4 hours and further dried while raising the temperature from 120° C. to 140° C. with an interval of 10° C. for one hour at the respective temperature. Thereafter, the resulting film was dried in vacuo at 140° C. for 4 hours using a vacuum dryer, to obtain a film having a thickness of about 100 μm. The resulting film had a light transmittance of 92%, a haze of 0.3%, a refractive index of 1.53, an Abbe number of 47, a retardation amount of 0 nm, and a Tg of 159° C.

The film was cut into a piece having a size of 5 cm×5 cm, which was then stretched by +50% upon free-width uniaxial stretching under a condition at a temperature of 180° C. and at a rate of stretching of 15 mm/min using a biaxial stretching machine (manufactured by Shibayama Scientific Co., Ltd.), to obtain a stretched film. The obtained stretched film had positive birefringence and a retardation amount within the film plane, $Re=(nx-ny)d$ of +90 nm per 100 μm of the stretched film thickness. Here, d stands for a film thickness.

COMPARATIVE EXAMPLE 3

In a one-liter autoclave were charged 400 ml of toluene as a polymerization solvent, 0.001 moles of perbutyl neodecanoate as a polymerization initiator, 0.42 moles of N-(4-ethylphenyl)maleimide, and 4.05 moles of isobutene, and the mixture was subjected to polymerization reaction under a polymerization condition at a polymerization temperature of 60° C. for a polymerization time of 5 hours, to obtain N-(4-ethylphenyl)maleimide-isobutene alternating copolymer. The thus obtained N-(4-ethylphenyl)maleimide-isobutene alternating copolymer had a weight average molecular weight (Mw) (as reduced into standard polystyrene) of 155,000 and an Mw/Mn of 2.6.

A solution consisting of 20% by weight of the resulting N-(4-ethylphenyl)maleimide-isobutene alternating copolymer and 80% by weight of methylene chloride was prepared and cast on a PET film. An N-(4-ethylphenyl)maleimide-isobutene alternating copolymer film formed after the methylene chloride had been volatilized and solidified from the solution was peeled. The film after peeling was dried at 100° C. for 4 hours and further dried while raising the temperature from 120° C. to 160° C. with an interval of 10° C. for one hour at the respective temperature. Thereafter, the resulting film was dried in vacuo at 180° C. for 4 hours using a vacuum dryer, to obtain a film having a thickness of about 100 μm.

The resulting film had a light transmittance of 92%, a haze of 0.3%, a refractive index of 1.56, an Abbe number of 28, a retardation amount of 0 nm, and a Tg of 187° C.

The film was cut into a piece having a size of 5 cm×5 cm, which was then stretched by +50% upon free-width uniaxial stretching under a condition at a temperature of 220° C. and at a rate of stretching of 15 mm/min using a biaxial stretching machine (manufactured by Shibayama Scientific Co., Ltd.), to obtain a stretched film. The obtained stretched film had positive birefringence and a retardation amount within the film plane, Re=(nx−ny)d of +140 nm per 100 μm of the stretched film thickness.

COMPARATIVE EXAMPLE 4

A stretched film was obtained in the same manner as in Comparative Example 1, except that in Comparative Example 1, the temperature for stretching the film was changed to 200° C. in place of 210° C. The obtained film had positive birefringence and a retardation amount within the film plane, Re=(nx−ny)d of +65 nm per 100 μm of the stretched film thickness. Here, d stands for a film thickness. A relationship among nx, ny and nz in the three-dimensional refractive indexes was nx>ny=nz.

COMPARATIVE EXAMPLE 6

A stretched film was obtained in the same manner as in Comparative Example 1, except that in Comparative Example 1, the film stretching was carried out upon simultaneous biaxial stretching using a biaxial stretching machine (manufactured by Imoto Machinery Co., Ltd.) in place of the free-width uniaxial stretching using a biaxial stretching machine (manufactured Shibayama Scientific Co., Ltd.), such that the film was stretched by +50% in the x-axis direction and the y-axis direction, respectively and that the temperature for stretching the film was changed to 220° C. in place of 210° C. The obtained film had positive birefringence and a retardation amount within the film plane, Re=(nx−ny)d of +100 nm per 100 μm of the stretched film thickness. Here, d stands for a film thickness. The three-dimensional refractive indexes were nx=ny>nz.

The invention provides transparent heat-resistant resin optical materials having excellent heat resistance and dynamic characteristics, having negative birefringence and exhibiting a high refractive index and a high Abbe number, which are especially useful as optical compensating members such as films, sheets and retardation films for LCD display element.

What is claimed is:

1. An optical compensating film, comprising:
   a copolymer consisting essentially of an olefin residue unit represented by the following formula (i):

wherein R1, R2, and R3 each represents hydrogen or an alkyl group having from 1 to 6 carbon atoms, and an N-phenyl-substituted maleimide residue unit represented by the following formula (ii):

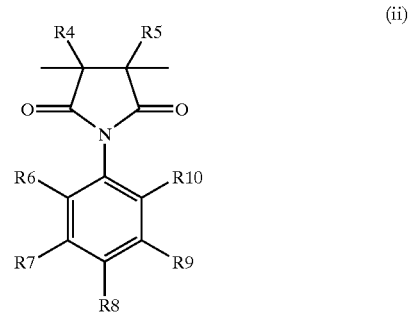

wherein

R4 and R5 each represents hydrogen or a linear or branched alkyl group having from 1 to 8 carbon atoms;

R7, R8, and R9 each represents hydrogen, a halogen based element, a carboxylic acid, a carboxylic acid ester, a hydroxyl group, a cyano group, a nitro group, or a linear or branched alkyl group having from 1 to 8 carbon atoms; and R6 and R10 each represents hydrogen, a halogen based element, a carboxylic acid, a carboxylic acid ester, a hydroxyl group, a cyano group, a nitro group, or a linear or branched alkyl group having from 1 to 8 carbon atoms, and when at least one of R6 or R10 represents hydrogen, the other should not be hydrogen but represent a halogen based element, a carboxylic acid, a carboxylic acid ester, a hydroxyl group, a cyano group, a nitro group, or a linear or branched alkyl group having from 1 to 8 carbon atoms, the copolymer having a weight average molecular weight, as reduced into standard polystyrene, of from 5×10³ to 5×10⁶, the optical compensating film being obtained by uniaxially stretch molding the copolymer, the optical compensating film having a relationship of three-dimensional refractive indexes of nz≧ny>nx in the case where the stretching direction is an x-axis within the film plane, the perpendicular direction to the x-axis within the film plane is a y-axis, and the vertical direction outside the film plane is a z-axis, nx stands for a refractive index in the x-axis direction, ny stands for a refractive index in the y-axis direction, and nz stands for a refractive index in the z-axis direction, and the optical compensating film exhibiting negative birefringence.

2. The optical compensating film as claimed in claim 1, wherein the copolymer consisting essentially of an olefin residue unit represented by the formula (i) and an N-phenyl-substituted maleimide reside unit represented by the formula (ii) is an alternating copolymer.

3. The optical compensating film as claimed in claim 1, wherein the olefin residue unit represented by the formula (i) is a residue unit derived from isobutene; and the N-phenyl-substituted maleimide residue represented by the formula (ii) is a residue unit derived from one or more members selected from the group consisting of N-(2-methylphenyl) maleimide, N-(2,6-diethylphenyl) maleimide, and N-(2,6-diisopropylphenyl)maleimide.

4. The optical compensating film as claimed in claim 1, which is a retardation film.

5. An optical compensating film, comprising:

a copolymer consisting essentially of an olefin residue unit represented by the following formula (i):

wherein R1, R2, and R3 each represents hydrogen or an alkyl group having from 1 to 6 carbon atoms, and an N-phenyl-substituted maleimide residue unit represented by the following formula (ii):

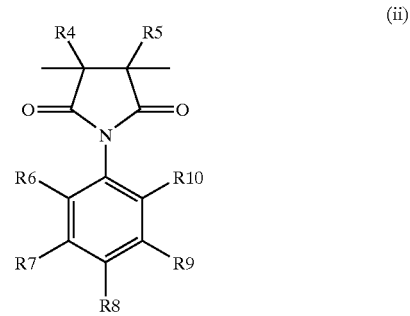

wherein

R4 and R5 each represents hydrogen or a linear or branched alkyl group having from 1 to 8 carbon atoms;

R7, R8, and R9 each represents hydrogen, a halogen based element, a carboxylic acid, a carboxylic acid ester, a hydroxyl group, a cyano group, a nitro group, or a linear or branched alkyl group having from 1 to 8 carbon atoms; and R6 and R10 each represents hydrogen, a halogen based element, a carboxylic acid, a carboxylic acid ester, a hydroxyl group, a cyano group, a nitro group, or a linear or branched alkyl group having from 1 to 8 carbon atoms, and when at least one of R6 or R10 represents hydrogen, the other should not be hydrogen but represent a halogen based element, a carboxylic acid, a carboxylic acid ester, a hydroxyl group, a cyano group, a nitro group, or a linear or branched alkyl group having from 1 to 8 carbon atoms, the copolymer having a weight average molecular weight, as reduced into standard polystyrene, of from $5\times10^3$ to $5\times10^6$, the optical compensating film being obtained by biaxially stretch molding the copolymer, the optical compensating film having a relationship of three-dimensional refractive indexes of nz>ny≧nx or nz>nx≧ny in the case where the biaxial stretching directions are an x-axis within the film plane and a y-axis within the film plane, and the vertical direction outside the film plane is a z-axis, nx stands for a refractive index in the x-axis direction, ny stands for a refractive index in the y-axis direction, and nz stands for a refractive index in the z-axis direction, and the optical compensating film exhibiting negative birefringence.

6. The optical compensating film as claimed in claim 5, wherein the copolymer consisting essentially of an olefin residue unit represented by the formula (i) and are N-phenyl-substituted maleimide reside unit represented by the formula (ii) is an alternating copolymer.

7. The optical compensating film as claimed in claim 5, wherein the olefin residue unit represented by the formula (i) is a residue unit derived from isobutene; and the N-phenyl-substituted maleimide residue represented by the formula (ii) is a residue unit derived from one or more members selected from the group consisting of N-(2methylphenyl) maleimide, N-(2,6-diethylphenyl)maleimide, and N-(2,6-diisopropylphenyl)maleimide.

8. The optical compensating film as claimed in claim 5, which is a retardation film.

* * * * *